US009387457B2

(12) United States Patent
Chen et al.

(10) Patent No.: US 9,387,457 B2
(45) Date of Patent: Jul. 12, 2016

(54) WATER VAPOR ADSORBENT FOR ADSORPTION HEAT PUMP, METHOD FOR PRODUCING WATER VAPOR ADSORBENT, AND ADSORPTION HEAT PUMP INCLUDING WATER VAPOR ADSORBENT

(71) Applicant: MITSUBISHI PLASTICS, INC., Chiyoda-ku (JP)

(72) Inventors: Haijun Chen, Yokohama (JP); Takahiko Takewaki, Yokohama (JP)

(73) Assignee: MITSUBISHI PLASTICS, INC., Chiyoda-ku (JP)

( * ) Notice: Subject to any disclaimer, the term of this patent is extended or adjusted under 35 U.S.C. 154(b) by 133 days.

(21) Appl. No.: 14/352,180

(22) PCT Filed: Oct. 1, 2012

(86) PCT No.: PCT/JP2012/075333
§ 371 (c)(1),
(2) Date: Apr. 16, 2014

(87) PCT Pub. No.: WO2013/061728
PCT Pub. Date: May 2, 2013

(65) Prior Publication Data
US 2014/0283545 A1  Sep. 25, 2014

(30) Foreign Application Priority Data
Oct. 26, 2011  (JP) .................................. 2011-235052

(51) Int. Cl.
*B01J 20/18*     (2006.01)
*B01J 20/30*     (2006.01)
*B01D 53/28*     (2006.01)
*C01B 39/54*     (2006.01)
*F25B 17/08*     (2006.01)

(52) U.S. Cl.
CPC .............. *B01J 20/3085* (2013.01); *B01D 53/28* (2013.01); *B01J 20/18* (2013.01); *B01J 20/186* (2013.01); *B01J 20/3078* (2013.01); *C01B 39/54* (2013.01); *F25B 17/08* (2013.01); *B01D 2253/108* (2013.01); *Y02P 20/129* (2015.11)

(58) Field of Classification Search
CPC .... B01J 20/18; B01J 20/3078; B01J 20/3085; F25B 17/08
USPC ........... 252/75, 77, 69; 62/476, 483; 423/700, 423/713, 705
See application file for complete search history.

(56) References Cited

U.S. PATENT DOCUMENTS 7,527,777 B2 * 5/2009 Watanabe ............ B01J 20/0292
165/10
8,795,418 B2 * 8/2014 Tabata ..................... B01J 20/02
427/386

2004/0089001 A1 * 5/2004 Kakiuchi ............. B01J 20/0292
62/112
2004/0093876 A1 * 5/2004 Inagaki ................... B01J 20/02
62/112
2006/0130652 A1 * 6/2006 Takewaki ............... B01D 53/28
95/148
2012/0020875 A1 * 1/2012 Matsuo ............... B01D 53/9418
423/700
2013/0266785 A1 * 10/2013 Chen ...................... B01J 20/18
428/219
2015/0110711 A1 * 4/2015 Franco ................... B01J 29/85
423/703
2015/0218007 A1 * 8/2015 Chen ...................... B01J 20/18
728/402

FOREIGN PATENT DOCUMENTS

| CN | 1495398 A | 5/2004 |
| CN | 1809508 A | 7/2006 |
| CN | 1880882 A | 12/2006 |
| CN | 101124161 A | 2/2008 |
| EP | 2 380 663 | 10/2011 |
| EP | 2 724 983 | 4/2014 |
| JP | 9 178292 | 7/1997 |
| JP | 11 197439 | 7/1999 |
| JP | 2003 114067 | 4/2003 |
| JP | 2003-183020 | 7/2003 |
| JP | 2009-97856 | 5/2009 |
| JP | 2010 42996 | 2/2010 |
| JP | 2011 202947 | 10/2011 |
| WO | 2010 084930 | 7/2010 |

OTHER PUBLICATIONS

Combined Office Action and Search Report issued Jun. 3, 2015 in Chinese Patent Application No. 201280052775.2 (with English language translation).
Supplementary European Search Report issued Jul. 29, 2015 in connection with corresponding European Patent Application No. 12 84 4182, filed Oct. 1, 2012.
International Search Report Issued Dec. 25, 2012 in PCT/JP12/075333 Filed Oct. 1, 2012.
Chinese Office Action issued Mar. 15, 2016, in corresponding Chinese Application No. 201280052775.2 (with English-language Translation).

* cited by examiner

*Primary Examiner* — Douglas Mc Ginty
(74) *Attorney, Agent, or Firm* — Oblon, McClelland, Maier & Neustadt, L.L.P.

(57) ABSTRACT

There is provided a water vapor adsorbent for adsorption heat pumps that has high adsorption and desorption performance and high water resistance, such as submersion resistance. The water vapor adsorbent contains a zeolite that contains at least a silicon atom, an aluminum atom, and a phosphorus atom in its framework structure and that has a framework density of 12.0 T/1,000 cubic angstroms or more and 16.0 T/1,000 cubic angstroms or less, wherein the water vapor adsorbent contains a group 11 metal of the periodic table, which constitutes 0.1% to 15% by weight of the zeolite. In the zeolite containing the group 11 metal, an ion of the group 11 metal substitutes for a Bronsted acid site, which promotes a hydrolysis reaction of the zeolite, and decreases the number of Bronsted acid sites of the zeolite, thereby improving the water resistance, such as submersion resistance, of the zeolite.

8 Claims, 2 Drawing Sheets

WATER VAPOR ADSORBENT FOR ADSORPTION HEAT PUMP, METHOD FOR PRODUCING WATER VAPOR ADSORBENT, AND ADSORPTION HEAT PUMP INCLUDING WATER VAPOR ADSORBENT

FIELD OF INVENTION

The present invention relates to a water vapor adsorbent containing a zeolite for use in adsorption heat pumps, a method for producing the water vapor adsorbent, and an adsorption heat pump including the water vapor adsorbent.

BACKGROUND OF INVENTION

In adsorption heat pumps and desiccant air conditioning systems, an adsorbent containing an adsorbate, such as water, is regenerated by heating the adsorbent to desorb the adsorbate, and the regenerated adsorbent is cooled to a temperature at which the adsorbate is adsorbed and is again used to adsorb the adsorbate. An absorption heat pump that utilizes waste heat having a relatively high temperature (120° C. or more) as a heat source for the regeneration of an adsorbent is practically used. However, heat of cooling water from cogeneration units, fuel cells, and automotive engines and solar heat generally has a relatively low temperature of 100° C. or less and cannot be utilized as a heat source for driving practically used absorption heat pumps. Thus, there has been a demand for effective utilization of low-temperature waste heat having a temperature of 100° C. or less or even in the range of 60° C. to 80° C.

Even in adsorption heat pumps having the same principle of operation, the adsorption characteristics required for an adsorbent greatly vary with the available heat source temperature. For example, the waste heat temperature of gas engine cogenerations and polymer electrolyte fuel cells used as high-temperature heat sources ranges from 60° C. to 80° C., and the temperature of cooling water from automotive engines ranges from 85° C. to 90° C. The temperature of a heat source for cooling also depends on the installation location of an apparatus. For example, the temperature of a heat source for cooling is the temperature of a radiator coolant in the case of automobiles or the temperature of water from a cooling tower or river water in the case of buildings and houses. Thus, the operation temperature of an adsorption heat pump installed in buildings ranges from approximately 25° C. to 35° C. on the low-temperature side and approximately 60° C. to 80° C. on the high-temperature side. The operation temperature of an adsorption heat pump installed in automobiles ranges from approximately 30° C. to 40° C. on the low-temperature side and approximately 85° C. to 90° C. on the high-temperature side. Thus, in order to effectively utilize waste heat, it is desirable to develop an apparatus that can operate even at a small temperature difference between the low-temperature heat source and the high-temperature heat source.

In order to satisfactorily operate an apparatus even when the environment surrounding an adsorbent has a relatively high temperature, it is necessary to adsorb an adsorbate at a low relative vapor pressure. In order to reduce the amount of adsorbent and reduce the size of an apparatus, it is necessary to increase the adsorption and desorption amounts of the adsorbent. The desorption of an adsorbate (regeneration of an adsorbent) using a low-temperature heat source requires that the adsorbent should have a low desorption temperature.

Thus, it is desirable that an adsorbent in an adsorption heat pump or a desiccant air conditioning system should (1) adsorb an adsorbate at a low relative vapor pressure (adsorb an adsorbate at a high temperature),
(2) have high adsorption and desorption amounts, and
(3) desorb the adsorbate at a high relative vapor pressure (desorb the adsorbate at a low temperature).

Existing adsorbents for use in adsorption heat pumps generally include silica gel and zeolites having a low silica/alumina ratio. However, existing adsorbents used in adsorption heat pumps have an insufficient adsorption and desorption capacity when a relatively low temperature heat source is used as a driving source for the adsorption heat pumps. For example, in the water vapor adsorption isotherm of zeolite 13X, which is a representative example of zeolites used in adsorption heat pumps, the amount of water vapor adsorbed on the zeolite is significant at a relative vapor pressure of 0.05 or less and remains unchanged at a relative vapor pressure of more than 0.05. In the regeneration of an adsorbent, the relative humidity of the ambient gas is decreased to desorb adsorbed water. In order to desorb water adsorbed on zeolite 13X, the relative vapor pressure must be decreased using a heat source having a temperature probably in the range of 150° C. to 200° C.

Mesoporous molecular sieves (such as FSM-10) synthesized using a micellar structure of a surfactant as a template are under study as adsorbents for use in heat pumps (Patent Literature 1). Porous aluminum phosphate molecular sieves commonly called $AlPO_4$ are under study as adsorbents for desiccants (Patent Literature 2). In particular, a mesoporous molecular sieve (FSM-10) is a promising material because the difference in adsorption amount of the mesoporous molecular sieve (FSM-10) between relative vapor pressures of 0.20 and 0.35 is as large as 0.25 g/g (Patent Literature 1: graph 4 in FIG. 14; FSM-10). However, the mesoporous molecular sieve (FSM-10) has a small adsorption amount in a relatively low relative vapor pressure range and a small difference in adsorption amount even in a relative vapor pressure range in which the adsorption amount varies greatly, resulting in poor performance of adsorption heat pumps. Furthermore, it has been pointed out that repeated use of the mesoporous molecular sieve (FSM-10) causes deformation of the structure thereof and results in a loss of adsorbent function. Thus, the mesoporous molecular sieve (FSM-10) has a durability problem.

In Patent Literature 3, there is proposed "a zeolite adsorbent for use in adsorption heat pumps that is made of an adsorbent having a relative vapor pressure region in which a change in relative vapor pressure of 0.15 in a relative vapor pressure range of 0.05 or more and 0.30 or less causes a change in the amount of adsorbed water of 0.18 g/g or more in a water vapor adsorption isotherm measured at 25° C.". Patent Literature 3 discloses that aluminophosphate is preferred. Such a zeolite adsorbent has a greater change in adsorption amount than known silica gel and zeolites in a certain relative vapor pressure range and has a greater dehumidification effect than known silica gel and zeolites of substantially the same weight. In an adsorption heat pump or a desiccant air conditioning system that includes an adsorbent having a great change in adsorption and desorption amounts in a relatively low relative vapor pressure range, because of a great difference in the amount of water adsorbed on and desorbed from the adsorbent, the adsorbent can be regenerated (desorption) at a low temperature, and the adsorption heat pump or the desiccant air conditioning system can be efficiently driven using a lower temperature heat source than before.

LIST OF LITERATURE

Patent Literature

Patent Literature 1: Japanese Patent Publication H9-178292A
Patent Literature 2: Japanese Patent Publication H11-197439A
Patent Literature 3: Japanese Patent Publication 2003-114067A

OBJECT AND SUMMARY OF INVENTION

It was found that the zeolite proposed in Patent Literature 3 had low water resistance when submerged in water (submersion resistance).

When a zeolite adsorbent is practically used in an adsorption heat pump or a desiccant air conditioning system, water condenses in the adsorption heat pump or the desiccant air conditioning system during the suspension of operation, and condensed water is deposited on the zeolite adsorbent. Deposited water droplets induce the decomposition of the zeolite and reduce the water vapor adsorption capacity of the zeolite. In particular, a high environmental temperature accelerates the hydrolysis of the zeolite and results in a marked reduction in the water vapor adsorption capacity of the zeolite.

Thus, it is desirable that an adsorbent in an adsorption heat pump or a desiccant air conditioning system should (1) adsorb an adsorbate at a low relative vapor pressure (adsorb an adsorbate at a high temperature),
(2) have high adsorption and desorption amounts,
(3) desorb the adsorbate at a high relative vapor pressure (desorb the adsorbate at a low temperature), and
(4) have high water resistance (submersion resistance) and avoid the problem of low adsorption capacity due to hydrolysis. The zeolite in Patent Literature 3, however, could not satisfy the requirement of water resistance, such as submersion resistance.

In view of these problems, it is an object of the present invention to provide a water vapor adsorbent for adsorption heat pumps that has high adsorption and desorption performance and high water resistance, such as submersion resistance.

As a result of extensive studies to solve the problems described above, the present inventors found that the inclusion or loading of a group 11 metal of the periodic table in an aluminophosphate zeolite containing an aluminum atom and a phosphorus atom in its framework structure, which is known as a preferred adsorbent for adsorption heat pumps, can significantly improve the water resistance, such as submersion resistance, of the zeolite while the performance of the adsorbent is maintained.

As a result of a submersion test of a zeolite, the present inventors found that a Bronsted acid site of the zeolite promotes a hydrolysis reaction of the zeolite. The present inventors also found that an ion of a group 11 metal of the periodic table loaded on a zeolite substitutes for a Bronsted acid site of the zeolite and decreases the number of Bronsted acid sites of the zeolite, thereby improving the water resistance, such as submersion resistance, of the zeolite.

The present invention has been achieved on the basis of such findings and is summarized as follows:

[1] A water vapor adsorbent for adsorption heat pumps, containing a zeolite that contains at least a silicon atom, an aluminum atom, and a phosphorus atom in its framework structure and that has a framework density of 12.0 T/1,000 cubic angstroms or more and 16.0 T/1,000 cubic angstroms or less, the water vapor adsorbent further comprising a group 11 metal of the periodic table in an amount 0.1% to 15% by weight of the zeolite.

[2] A water vapor adsorbent for adsorption heat pumps, containing a zeolite that contains at least a silicon atom, an aluminum atom, and a phosphorus atom in its framework structure, wherein the water vapor adsorbent has an adsorption retention ratio of 70% or more at a relative humidity (P/Ps) of 0.3, the adsorption retention ratio being the ratio of the amount of adsorbed water vapor after the following submersion test to the amount of adsorbed water vapor before the submersion test.

<Submersion Test>

A slurry of 0.5 g of a sample dispersed in 5 g of water is poured into a fluoropolymer inner tube in a stainless steel autoclave. After the slurry is left standing at 100° C. for 24 hours, the sample is collected by filtration and is dried at 100° C. for 12 hours.

[3] The water vapor adsorbent for adsorption heat pumps according to [2], further containing a group 11 metal of the periodic table in an amount 0.1% to 15% by weight of the zeolite.

[4] The water vapor adsorbent for adsorption heat pumps according to any one of [1] to [3], wherein the zeolite has a zeolite structure of CHA as defined by the IZA.

[5] The water vapor adsorbent for adsorption heat pumps according to [1], [3], or [4], wherein the group 11 metal of the periodic table is copper.

[6] The water vapor adsorbent for adsorption heat pumps according to any one of [1] and [3] to [5], wherein the group 11 metal of the periodic table constitutes 0.1% to 10% by weight of the zeolite.

[7] The water vapor adsorbent for adsorption heat pumps according to any one of [1] to [6], a change in relative vapor pressure of 0.15 in a relative vapor pressure range of 0.05 or more and 0.30 or less causes a change in the amount of adsorbed water of 0.15 g-$H_2O$/g or more.

[8] A method for producing the water vapor adsorbent for adsorption heat pumps according to any one of [1] to [7], involving loading a group 11 metal of the periodic table onto a zeolite that contains at least a silicon atom, an aluminum atom, and a phosphorus atom in its framework structure and that has a framework density of 12.0 T/1,000 cubic angstroms or more and 16.0 T/1,000 cubic angstroms or less.

[9] A method for producing a water vapor adsorbent for adsorption heat pumps according to any one of [1] to [7], involving a hydrothermal synthesis using an aqueous gel containing a raw material for a silicon atom, a raw material for an aluminum atom, a raw material for a phosphorus atom, a raw material for a group 11 metal of the periodic table, and a polyamine.

[10] An adsorption heat pump, containing the water vapor adsorbent for adsorption heat pumps according to any one of [1] to [7].

ADVANTAGEOUS EFFECTS OF INVENTION

The present invention provides a water vapor adsorbent for adsorption heat pumps that has high adsorption and desorption performance, such as water vapor adsorption and desorption cycle durability, and high water resistance, such as submersion resistance, without the problem of low adsorption performance due to water condensation. The present invention also provides an adsorption heat pump that contains the water vapor adsorbent for adsorption heat pumps and has long-term durability and reliability.

DESCRIPTION OF EMBODIMENTS

The present invention will be described in detail below. The constituent features described below are embodiments (representative embodiments) of the present invention. The present invention is not limited to these embodiments.

[Water Vapor Adsorbent for Adsorption Heat Pumps]

The water vapor adsorbent according to the present invention contains a zeolite that contains at least a silicon atom, an aluminum atom, and a phosphorus atom in its framework structure and that has a framework density of 12.0 T/1,000 cubic angstroms or more and 16.0 T/1,000 cubic angstroms or less and further contains a group 11 metal of the periodic table (hereinafter also referred to simply as a "group 11 metal"), which constitutes 0.1% to 15% by weight of the zeolite.

<Zeolite>

A zeolite used in the present invention contains at least a silicon atom, an aluminum atom, and a phosphorus atom in its framework structure.

In the zeolite containing a silicon atom, an aluminum atom, and a phosphorus atom in its framework structure, the ratios between the aluminum atom, the phosphorus atom, and the silicon atom preferably satisfy the following formulae (I), (II), and (III).

$$0.05 \le x \le 0.11 \quad (I)$$

(In the formula (I), x denotes the molar ratio of the silicon atom to the total of the silicon atom, the aluminum atom, and the phosphorus atom of the framework structure.)

$$0.3 \le y \le 0.6 \quad (II)$$

(In the formula (II), y denotes the molar ratio of the aluminum atom to the total of the silicon atom, the aluminum atom, and the phosphorus atom of the framework structure.)

$$0.3 \le z \le 0.6 \quad (III)$$

(In the formula (III), z denotes the molar ratio of the phosphorus atom to the total of the silicon atom, the aluminum atom, and the phosphorus atom of the framework structure.)

The amount of silicon in the zeolite more preferably satisfies the following formula (IV), still more preferably the following formula (V), still more preferably the following formula (VI).

$$0.06 \le x \le 0.105 \quad (IV)$$

$$0.07 \le x \le 0.10 \quad (V)$$

$$0.075 \le x \le 0.095 \quad (VI)$$

(In the formulae (IV) to (VI), x is the same as described above.)

The values x, y, and z within these ranges result in the formation of a zeolite having desired adsorption characteristics and sufficient durability.

In the present invention, a zeolite may contain an element other than the silicon atom, the aluminum atom, and the phosphorus atom in its framework structure. Examples of the other element include lithium, magnesium, titanium, zirconium, vanadium, chromium, manganese, iron, cobalt, nickel, palladium, copper, zinc, gallium, germanium, arsenic, tin, calcium, and boron. A zeolite according to an embodiment of the present invention may contain these elements alone or in combination with two or more in its framework structure.

In the case that a zeolite according to the present invention contains a group 11 metal in its framework structure, the amount of group 11 metal in the framework structure is also included in the amount of group 11 metal in a water vapor adsorbent for adsorption heat pumps according to the present invention.

A group 11 metal in a water vapor adsorbent according to the present invention may be contained in the framework structure of the zeolite, in the outside of the framework structure, or in both. In the present invention, most of the group 11 metal is preferably contained in the outside of the framework structure rather than in the framework structure of the zeolite; in other words, most of the group 11 metal is preferably supported by the framework structure of the zeolite.

The ratios between the atoms described above can be determined through an elementary analysis. In the present invention, the elementary analysis involves an ICP analysis of a sample dissolved in aqueous hydrochloric acid by the application of heat.

The framework density reflects the crystal structure. The framework density of a zeolite in the present invention is a value described in ATLAS OF ZEOLITE FRAMEWORK TYPES Fifth Revised Edition 2001 of the International Zeolite Association (IZA) and is 12.0 T/1,000 cubic angstroms or more and 16.0 T/1,000 cubic angstroms or less. The upper limit of the framework density is preferably 15.0 T/1,000 cubic angstroms, and the lower limit of the framework density is preferably 13.0 T/1,000 cubic angstroms. A framework density below the lower limit tends to result in an unstable structure. A framework density above the upper limit tends to result in a small adsorption amount.

The structure of a zeolite that can be used in the present invention is not particularly limited and may be AEI, AEL, AET, AFI, AFN, AFR, AFS, AFT, AFX, ATO, ATS, CHA, ERI, LEV, SOD, or VFI as defined by the IZA. Among these, the structure of AEI, AEL, AFI, CHA, LEV, or SOD is preferred in terms of adsorption characteristics and durability, and the structure of CHA is particularly preferred in terms of durability and adsorption characteristics.

<Group 11 Metal>

A group 11 metal in a water vapor adsorbent for adsorption heat pumps according to the present invention is intended to remove a Bronsted acid site in the zeolite and is preferably, copper, silver, or gold, more preferably copper. The raw material of a group 11 metal is not particularly limited and is generally an inorganic acid salt, such as sulfate, nitrate, phosphate, chloride, or bromide, an organic acid salt, such as an acetate, oxalate, or citrate, or an organometallic compound, such as pentacarbonyl or ferrocene, of the group 11 metal. Among these, an inorganic acid salt or an organic acid salt, for example, nitrate, sulfate, acetate, or hydrochloride is preferred in terms of water solubility. A colloidal oxide or an oxide fine powder may also be used.

A water vapor adsorbent according to the present invention may contain one type of group 11 metal or at least two types of group 11 metal at any ratio.

In order to achieve sufficient adsorption of water vapor, water vapor adsorption and desorption cycle durability, and submersion test durability, the group 11 metal content of a water vapor adsorbent according to the present invention ranges from 0.1% to 15% by weight, preferably 0.1% to 10% by weight, more preferably 0.2% to 5% by weight, still more preferably 0.3% to 3% by weight, of the zeolite.

A group 11 metal content of the water vapor adsorbent below the lower limit tends to result in an insufficient water resistance improving effect of the group 11 metal. A group 11 metal content of the water vapor adsorbent above the upper limit tends to result in poor adsorption performance.

A group 11 metal in the framework structure of a zeolite often does not contribute to the reduction of the number of Bronsted acid sites. Thus, 5% by weight or more, preferably 10% by weight or more, more preferably 50% by weight or more, still more preferably 70% by weight or more, most preferably 100%, of the group 11 metal in a water vapor adsorbent according to the present invention is preferably on the outside of the framework structure of the zeolite and is preferably loaded on the zeolite.

A water vapor adsorbent for adsorption heat pumps according to the present invention contains a zeolite that contains at least a silicon atom, an aluminum atom, and a phosphorus atom in its framework structure, wherein the water vapor adsorbent has an adsorption retention ratio of 70% or more at a relative humidity (P/Ps) of 0.3, the adsorption retention ratio being the ratio of the amount of adsorbed water vapor after the following submersion test to the amount of adsorbed water vapor before the submersion test.

(Submersion Test)

A slurry of 0.5 g of a sample dispersed in 5 g of water is poured into a fluoropolymer inner tube in a stainless steel autoclave. After the slurry is left standing at 100° C. for 24 hours, the sample is collected by filtration and is dried at 100° C. for 12 hours.

An adsorbent that has such an adsorption retention ratio is preferably a water vapor adsorbent that contains a zeolite containing at least a silicon atom, an aluminum atom, and a phosphorus atom in its framework structure and having a framework density of 12.0 T/1,000 cubic angstroms or more and 16.0 T/1,000 cubic angstroms or less and further contains a group 11 metal of the periodic table, which constitutes 0.1% to 15% by weight of the zeolite, as described above.

[Method for Producing Water Vapor Adsorbent for Adsorption Heat Pumps]

A method for producing a water vapor adsorbent for adsorption heat pumps according to the present invention may be, but is not limited to, (A) a method for loading a predetermined amount of a group 11 metal onto a synthesized zeolite through a metal loading process; more specifically, a method for producing a zeolite that contains at least a silicon atom, an aluminum atom, and a phosphorus atom in its framework structure and that has a framework density of 12.0 T/1,000 cubic angstroms or more and 16.0 T/1,000 cubic angstroms or less and loading the zeolite with a group 11 metal, which constitutes 0.1% to 10% by weight of the zeolite (hereinafter referred to as a "production method (A)"), or (B) a hydrothermal synthesis method for a zeolite using an aqueous gel containing a raw material for a silicon atom, a raw material for an aluminum atom, a raw material for a phosphorus atom, a raw material for a group 11 metal, and a polyamine; more specifically, a method for producing a zeolite having a framework density of 12.0 T/1,000 cubic angstroms or more and 16.0 T/1,000 cubic angstroms or less and loaded with a group 11 metal, which constitutes 0.1% to 15% by weight of the zeolite, through a hydrothermal synthesis using an aqueous gel containing a raw material for a silicon atom, a raw material for an aluminum atom, a raw material for a phosphorus atom, a raw material for a group 11 metal, and a polyamine (hereinafter referred to as a "production method (B)").

{Production Method (A)}

The production method (A) for producing a water vapor adsorbent for adsorption heat pumps according to the present invention will be described below.

<Production of Zeolite>

A method for producing a zeolite onto which a group 11 metal is to be loaded is not particularly limited and may be the following method, which is based on a method described in Japanese Examined Patent Application Publication No. 4-37007, Japanese Examined Patent Application Publication No. 5-21844, Japanese Examined Patent Application Publication No. 5-51533, or U.S. Pat. No. 4,440,871.

More specifically, a mixture of a raw material of an aluminum atom, a raw material of a silicon atom, a raw material of a phosphorus atom, and a template is subjected to a hydrothermal synthesis. A zeolite is obtained by removing the template.

<Raw Material of an Aluminum Atom>

The raw material of an aluminum atom in a zeolite according to the present invention is not particularly limited and may generally be pseudo-boehmite, an aluminum alkoxide, such as aluminum isopropoxide or aluminum triethoxide, aluminum hydroxide, alumina sol, or sodium aluminate. These raw materials may be used alone or in combination with two or more. The raw material of an aluminum atom is preferably pseudo-boehmite for convenience in handling and high reactivity.

<Raw Material of a Silicon Atom>

The raw material of a silicon atom in a zeolite according to the present invention is not particularly limited and may generally be fumed silica, silica sol, colloidal silica, water glass, ethyl silicate, or methyl silicate. These raw materials may be used alone or in combination with two or more. The raw material of a silicon atom is preferably fumed silica because of its high purity and reactivity.

<Raw Material for a Phosphorus Atom>

The raw material of a phosphorus atom in a zeolite according to the present invention is generally phosphoric acid and may be aluminum phosphate. The raw material of a phosphorus atom may be used alone or in combination with two or more.

<Template>

The template may be a template used in known methods. In particular, the template preferably contains at least one compound selected from each of at least two of the following three groups:

(1) alicyclic heterocyclic compounds containing a nitrogen atom as a heteroatom, (2) alkylamines, and (3) tetraalkylammonium hydroxides.

More preferably, the template contains at least one compound selected from each of the groups (1) and (2).

(1) Alicyclic Heterocyclic Compounds Containing a Nitrogen Atom as Heteroatom

A heterocycle of each of the alicyclic heterocyclic compounds containing a nitrogen atom as a heteroatom is generally a 5-, 6-, or 7-membered ring, preferably a 6-membered ring. The number of heteroatoms of the heterocycle is generally 3 or less, preferably 2 or less. The alicyclic heterocyclic compounds may contain a heteroatom other than the nitrogen atom. An alicyclic heterocyclic compound containing an oxygen atom in addition to a nitrogen atom is preferred. The heteroatom(s) may take any position and are preferably not adjacent to each other.

The alicyclic heterocyclic compounds containing a nitrogen atom as a heteroatom generally have a molecular weight of 250 or less, preferably 200 or less, more preferably 150 or less, and generally 30 or more, preferably 40 or more, more preferably 50 or more.

Examples of the alicyclic heterocyclic compounds containing a nitrogen atom as a heteroatom include morpholine, N-methylmorpholine, piperidine, piperazine, N,N'-dimethylpiperazine, 1,4-diazabicyclo(2,2,2)octane, N-methylpiperidine, 3-methylpiperidine, quinuclidine, pyrrolidine, N-methylpyrrolidone, and hexamethyleneimine. These alicyclic heterocyclic compounds may be used alone or in combination with two or more. Among these, morpholine, hexamethyleneimine, and piperidine are preferred, and morpholine is particularly preferred.

(2) Alkylamines

An alkyl group of each of the alkylamines is generally a linear alkyl group. The number of alkyl groups of each of the alkylamines is preferably, but is not limited to, 3 per molecule.

An alkyl group of each of the alkylamines may have a substituent, such as a hydroxy group.

An alkyl group of each of the alkylamines preferably has 4 or less carbon atoms. More preferably, the total number of carbon atoms of the alkyl group(s) is 5 or more and 10 or less per molecule.

The alkylamines generally have a molecular weight of 250 or less, preferably 200 or less, more preferably 150 or less.

Examples of the alkylamines include di-n-propylamine, tri-n-propylamine, tri-isopropylamine, triethylamine, triethanolamine, N,N-diethylethanolamine, N,N-dimethylethanolamine, N-methyldiethanolamine, N-methylethanolamine, di-n-butylamine, neopentylamine, di-n-pentylamine, isopropylamine, t-butylamine, ethylenediamine, di-isopropyl-ethylamine, and N-methyl-n-butylamine. These alkylamines may be used alone or in combination with two or more. Among these, di-n-propylamine, tri-n-propylamine, tri-isopropylamine, triethylamine, di-n-butylamine, isopropylamine, t-butylamine, ethylenediamine, di-isopropyl-ethylamine, and N-methyl-n-butylamine are preferred, and triethylamine is particularly preferred.

(3) Tetraalkylammonium Hydroxides

The tetraalkylammonium hydroxides preferably have four alkyl groups having 4 or less carbon atoms. The tetraalkylammonium hydroxides may be used alone or in combination with two or more.

When two or more compounds are used in combination as templates, any two or more compounds may be used in combination. In particular, morpholine and triethylamine are preferably used in combination.

The mixing ratio of these template groups depends on the conditions. When two templates are mixed, the molar ratio of the two templates ranges from 1:20 to 20:1, preferably 1:10 to 10:1, more preferably 1:5 to 5:1. When three templates are mixed, the molar ratio of a third template to the total of the other two templates, preferably an (1) alicyclic heterocyclic compound containing a nitrogen atom as a heteroatom and an (2) alkylamine, mixed at the molar ratio described above ranges from 1:20 to 20:1, preferably 1:10 to 10:1, more preferably 1:5 to 5:1.

Although a template is not necessarily required, use of such a template advantageously allows the Si content of the zeolite to be controlled. The reason for this is not clear but is supposed to be as follows:

For example, in the synthesize of a silicoaluminophosphate (SAPO) having a CHA structure, a SAPO having a high Si content can be relatively easily synthesized using an (1) alicyclic heterocyclic compound containing a nitrogen atom as a heteroatom, for example, morpholine. In the synthesize of a SAPO having a low Si content, however, use of an (1) alicyclic heterocyclic compound containing a nitrogen atom as a heteroatom results in difficult crystallization because of great amounts of dense component and amorphous component. On the other hand, a SAPO having the CHA structure may be synthesized using an (2) alkylamine, for example, triethylamine, under limited conditions, as described above, but a mixture of SAPOs having various structures is generally produced. Conversely, a crystal structure without a dense component or an amorphous component tends to be produced. Thus, the template (1) characteristically induces a CHA structure, and the template (2) characteristically promotes the crystallization of SAPO. A combination of these characteristics can produce a synergistic effect, which cannot be achieved with the template (1) or (2) alone.

<Synthesis of Zeolite Through Hydrothermal Synthesis>

The raw material of a silicon atom, the raw material of an aluminum atom, the raw material of a phosphorus atom, the template, and water are mixed to prepare an aqueous gel. The mixing sequence of these compounds are not particularly limited and may be appropriately determined in accordance with the conditions. In general, water is first mixed with the raw material of a phosphorus atom and the raw material of an aluminum atom and then with the raw material of a silicon atom and the template.

In the composition of the aqueous gel expressed by the molar ratio of oxides of the raw material of a silicon atom, the raw material of an aluminum atom, and the raw material of a phosphorus atom, the $SiO_2/Al_2O_3$ ratio is generally greater than zero, preferably 0.02 or more, and generally 0.5 or less, preferably 0.4 or less, more preferably 0.3 or less; and the $P_2O_5/Al_2O_3$ ratio is generally 0.6 or more, preferably 0.7 or more, more preferably 0.8 or more, and generally 1.3 or less, preferably 1.2 or less, more preferably 1.1 or less.

The composition of a zeolite produced through hydrothermal synthesis correlates with the composition of the aqueous gel. Thus, in order to produce a zeolite having a desired composition, the composition of the aqueous gel may be appropriately determined.

The molar ratio of all the template(s) to $Al_2O_3$ is generally 0.2 or more, preferably 0.5 or more, more preferably 1 or more, and generally 4 or less, preferably 3 or less, more preferably 2.5 or less.

At least one template selected from each of the at least two groups may be mixed in any order. The templates may be prepared before mixed with another component, or each of the templates may be mixed with another component.

The molar ratio of water to $Al_2O_3$ is generally 3 or more, preferably 5 or more, more preferably 10 or more, and generally 200 or less, preferably 150 or less, more preferably 120 or less.

The pH of the aqueous gel is generally 5 or more, preferably 6 or more, more preferably 6.5 or more, and generally 10 or less, preferably 9 or less, more preferably 8.5 or less.

If desired, the aqueous gel may contain another component. Such a component may be an alkali metal or alkaline-earth metal hydroxide or salt or a hydrophilic organic solvent, such as an alcohol. In this case, the molar ratio of the alkali metal or alkaline-earth metal hydroxide or salt to $Al_2O_3$ is generally 0.2 or less, preferably 0.1 or less, and the molar ratio of the hydrophilic organic solvent, such as an alcohol, to water is generally 0.5 or less, preferably 0.3 or less.

The aqueous gel thus prepared is poured into a pressure vessel and is subjected to hydrothermal synthesis at a predetermined temperature while the aqueous gel is stirred or left standing under autogenous pressure or under a gas pressure wherein the gas does not inhibit the crystallization. The reaction temperature in the hydrothermal synthesis is generally 100° C. or more, preferably 120° C. or more, more preferably 150° C. or more, and generally 300° C. or less, preferably 250° C. or less, more preferably 220° C. or less. Within these temperature ranges, during temperature rise to the highest or maximum attainable temperature, the aqueous gel is preferably held at a temperature in the range of 80° C. to 120° C. for one hour or more, more preferably two hours or more. When the holding time in this temperature range is less than one hour, a zeolite prepared by firing the resulting template-containing zeolite has insufficient durability. Although there is no upper limit of the holding time, an excessively long holding time is unfavorable because of low production efficiency. Thus, the holding time is generally 50 hours or less, preferably 24 hours or less.

The temperature in this temperature range may be increased in any way, for example, monotonously, stepwise, in an up-and-down manner like waves, or a combination of any of these ways. In general, for ease of control, the temperature is suitably increased monotonously at a heating rate of a certain value or less.

In the present invention, the aqueous gel is preferably held at approximately the maximum attainable temperature for a predetermined time. The term "approximately the maximum attainable temperature", as used herein, refers to a temperature in the range of 5° C. below the maximum attainable temperature to the maximum attainable temperature. The holding time at approximately the maximum attainable temperature depends on ease with which a desired zeolite can be synthesized and is generally 0.5 hours or more, preferably 3 hours or more, more preferably 5 hours or more, and generally 30 days or less, preferably 10 days or less, more preferably 4 days or less.

The temperature may be decreased from the maximum attainable temperature in any way, for example, stepwise, in an up-and-down manner like waves without exceeding the maximum attainable temperature, or a combination thereof. In general, for ease of control and in terms of the durability of the resulting zeolite, the temperature is decreased from the maximum attainable temperature to a temperature in the range of 100° C. to room temperature.

<Collection of Zeolite>

After the hydrothermal synthesis, the resulting zeolite is collected from the product. The resulting zeolite may be collected from the product using any method. In general, the solid content is first separated by filtration or decantation, is washed with water, and is dried at room temperature or a temperature of 150° C. or less, thus yielding a zeolite containing a template.

The template is then removed from the zeolite containing the template using any method, including a known method. In general, the template can be removed by firing the zeolite in an atmosphere of air, an inert gas containing oxygen, or an inert gas at a temperature in the range of 300° C. to 1000° C. or by extracting the template using an extractant, such as aqueous ethanol or ether containing HCl.

The firing temperature preferably ranges from 400° C. to 900° C., more preferably 450° C. to 850° C., still more preferably 500° C. to 800° C., and the firing time preferably ranges from approximately one second to 24 hours.

The removal of the template through firing or another process is not necessarily required. The zeolite containing the template may be used in the subsequent process of loading a group 11 metal.

<Loading of a Group 11 Metal>

A group 11 metal may be loaded onto the zeolite through any process, for example, a generally used process, such as an ion exchange process, an impregnation loading process, a precipitation loading process, a solid-phase ion exchange process, a CVD process, or a spray drying process. A solid-phase ion exchange process, an impregnation loading process, or a spray drying process is preferred.

The raw material of a group 11 metal is not particularly limited and is generally an inorganic acid salt, such as sulfate, nitrate, phosphate, chloride, or bromide, an organic acid salt, such as an acetate, oxalate, or citrate, or an organometallic compound, such as pentacarbonyl or ferrocene, of the group 11 metal. Among these, an inorganic acid salt or an organic acid salt, for example, nitrate, sulfate, acetate, or hydrochloride is preferred in terms of water solubility. A colloidal oxide or an oxide fine powder may also be used.

The raw material of a group 11 metal may be a combination of two or more different group 11 metal species or compounds.

The zeolite loaded with the group 11 metal is preferably fired at a temperature in the range of 400° C. to 900° C., more preferably 450° C. to 850° C., still more preferably 500° C. to 800° C., for approximately 1 second to 24 hours, preferably approximately 10 seconds to 8 hours, more preferably approximately 30 minutes to 4 hours. Although the firing is not necessarily required, the firing can improve the dispersion of the group 11 metal loaded onto the framework structure of the zeolite and effectively improve the water resistance of the zeolite.

As described above, in order to achieve sufficient adsorption of water vapor, water vapor adsorption and desorption cycle durability, and submersion test durability, the amount of group 11 metal to be loaded ranges from 0.1% to 15% by weight, preferably 0.1% to 10% by weight, more preferably 0.2% to 5% by weight, still more preferably 0.3% to 3% by weight, of the zeolite.

The zeolite loaded with the group 11 metal thus produced may be directly used as a water vapor adsorbent in the form of powder or may be mixed with a known binder, such as silica, alumina, or clay mineral, and subjected to granulation or shaping before being used as a water vapor adsorbent.

{Production Method (B)}

The production method (B) for producing a water vapor adsorbent for adsorption heat pumps according to the present invention will be described below.

In the production method (B), a zeolite loaded with a group 11 metal is produced through a hydrothermal synthesis using an aqueous gel containing a raw material of a silicon atom, a raw material of an aluminum atom, a raw material of a phosphorus atom, a raw material of a group 11 metal, and a polyamine.

In the production method (B), since the aqueous gel used in the hydrothermal synthesis of the zeolite contains the raw material of the group 11 metal and the polyamine, the group 11 metal in the aqueous gel is stabilized through a strong interaction with the polyamine and rarely reacts with zeolite framework elements. Thus, the group 11 metal is mainly dispersed and loaded into the pores of the zeolite on the outside of the framework structure of the zeolite.

In the production method (B), the polyamine also functions as a template. The other conditions of the production method (B) are not particularly limited and may be those of a known hydrothermal synthesis method as described in the production method (A). The aqueous gel may contain a template other than the polyamine. After the hydrothermal synthesis using the aqueous gel, a zeolite is obtained by removing the polyamine and another template. One example of the production method (B) will be more specifically described below.

<Raw Materials>

The raw material of a silicon atom, the raw material of an aluminum atom, the raw material of a phosphorus atom, and the raw material of a group 11 metal may be the raw materials described in the production method (A).

<Polyamine>

The polyamine used in the production method (B) is preferably a polyamine compound having two or more alkyleneimino chains represented by the general formula $H_2N-(CnH_{2n}NH)_x-H$ (wherein n denotes an integer in the range of 2 to 6, and x denotes an integer in the range of 1 to 6).

In the general formula, n preferably denotes an integer in the range of 2 to 5, more preferably 2 to 4, still more preferably 2 or 3, particularly preferably 2. In the general formula, x preferably denotes an integer in the range of 2 to 5, more preferably 2 to 4, still more preferably 3 or 4, particularly preferably 4.

Such a polyamine is preferably inexpensive ethylenediamine, diethylenetriamine, triethylenetetramine, or tetraethylenepentamine, more preferably triethylenetetramine or tetraethylenepentamine. These polyamines may be used alone or in combination with two or more.

<Another Template>

In the production method (B), the polyamine may be used in combination with another template. The other template is preferably at least one compound selected from each of at least two of the following three groups: (1) alicyclic heterocyclic compounds containing nitrogen as a heteroatom, (2) alkylamines, and (3) tetraalkylammonium hydroxides, as described in the production method (A). These compounds may be the same as described in the production method (A) and may be used under the same conditions as described in the production method (A).

<Synthesis of Zeolite Loaded with Group 11 Metal Through Hydrothermal Synthesis>

The raw material of a silicon atom, the raw material of an aluminum atom, the raw material of a phosphorus atom, the raw material of a group 11 metal, the polyamine, and an optional template are mixed with water to prepare an aqueous gel. The mixing sequence of these compounds are not particularly limited and may be appropriately determined in accordance with the conditions. For example, water is first mixed with the raw material of a phosphorus atom and the raw material of an aluminum atom and then with the raw material of a silicon atom, the raw material of a group 11 metal, the polyamine, and another template.

In the composition of the aqueous gel expressed by the molar ratio of oxides of the raw material of a silicon atom, the raw material of an aluminum atom, the raw material of a phosphorus atom, and the raw material of a group 11 metal (M), the $SiO_2/Al_2O_3$ ratio is generally greater than zero, and generally 0.5 or less, preferably 0.4 or less, more preferably 0.3 or less; the $P_2O_5/Al_2O_3$ ratio is generally 0.6 or more, preferably 0.7 or more, more preferably 0.8 or more, and generally 1.3 or less, preferably 1.2 or less, more preferably 1.1 or less; and the $M_aO_b/Al_2O_3$ ratio (wherein a and b denote the atomic ratio of M and O, respectively) is generally 0.01 or more, preferably 0.03 or more, more preferably 0.05 or more.

The composition of a zeolite produced through hydrothermal synthesis correlates with the composition of the aqueous gel. Thus, in order to produce a zeolite having a desired composition, the composition of the aqueous gel is appropriately determined in the ranges described above.

The amount of polyamine in the aqueous gel depends on the presence of another template as described below.

<In the Case of Using Another Template>

In the case of using another template, the total amount of the polyamine and the other template is such that the molar ratio of the total of the polyamine and the other template to $Al_2O_3$ is generally 0.2 or more, preferably 0.5 or more, more preferably 1 or more, and generally 4 or less, preferably 3 or less, more preferably 2.5 or less.

The polyamine is preferably used such that the molar ratio of the polyamine to $M_aO_b$ is generally 0.1 or more, preferably 0.5 or more, more preferably 0.8 or more, and generally 10 or less, preferably 5 or less, more preferably 4 or less.

<In the Case of not Using Another Template>

In the case of not using another template, because of the same reason as described above, the amount of polyamine is preferably such that the molar ratio of the polyamine to $Al_2O_3$ is generally 0.2 or more, preferably 0.5 or more, more preferably 1 or more, and generally 4 or less, preferably 3 or less, more preferably 2.5 or less, and such that the molar ratio of the polyamine to $M_aO_b$ is generally 1 or more, preferably 5 or more, more preferably 10 or more, and generally 50 or less, preferably 30 or less, more preferably 20 or less.

The other template is appropriately selected in accordance with the conditions. For example, when morpholine and triethylamine are used, the morpholine/triethylamine molar ratio ranges from 0.05 to 20, preferably 0.1 to 10, more preferably 0.2 to 9. At least one template selected from each of the at least two groups may be mixed in any order. The templates may be prepared before mixed with another substance, or each of the templates may be mixed with another substance.

The molar ratio of water to $Al_2O_3$ is generally 3 or more, preferably 5 or more, more preferably 10 or more, and generally 200 or less, preferably 150 or less, more preferably 120 or less.

The pH of the aqueous gel is generally 5 or more, preferably 6 or more, more preferably 6.5 or more, and generally 11 or less, preferably 10 or less, more preferably 9 or less.

If desired, the aqueous gel may contain another component. Such a component may be an alkali metal or alkaline-earth metal hydroxide or salt or a hydrophilic organic solvent, such as an alcohol. In this case, the molar ratio of the alkali metal or alkaline-earth metal hydroxide or salt to $Al_2O_3$ is generally 0.2 or less, preferably 0.1 or less, and the molar ratio of the hydrophilic organic solvent, such as an alcohol, to water is generally 0.5 or less, preferably 0.3 or less.

The aqueous gel thus prepared is poured into a pressure vessel and is subjected to hydrothermal synthesis at a predetermined temperature while the aqueous gel is stirred or left standing under autogenous pressure or under a gas pressure wherein the gas does not inhibit the crystallization. The reaction temperature in the hydrothermal synthesis is generally 100° C. or more, preferably 120° C. or more, more preferably 150° C. or more, and generally 300° C. or less, preferably 250° C. or less, more preferably 220° C. or less. The reaction time is generally 2 hours or more, preferably 3 hours or more, more preferably 5 hours or more, and generally 30 days or less, preferably 10 days or less, more preferably 4 days or less. The reaction temperature may be constant during the reaction or may be changed stepwise.

<Collection of Zeolite>

After the hydrothermal synthesis, zeolite is collected from the product. Zeolite may be collected from the product using any method. In general, the solid content is first separated by filtration or decantation, is washed with water, and is dried at room temperature or a temperature of 150° C. or less, thus yielding a zeolite containing a template.

The template is then removed from the zeolite containing the template using any method, including a known method. In general, the template can be removed by firing the zeolite in an atmosphere of air, an inert gas containing oxygen, or an inert gas at a temperature in the range of 300° C. to 1000° C. or by extracting the template using an extractant, such as aqueous ethanol or ether containing HCl.

The firing temperature preferably ranges from 400° C. to 900° C., more preferably 450° C. to 850° C., still preferably 500° C. to 800° C. The firing time ranges from 1 second to 24 hours, preferably 10 seconds to 8 hours, more preferably 30 minutes to 4 hours.

The zeolite loaded with the group 11 metal thus produced may be directly used as a water vapor adsorbent in the form of powder or may be mixed with a known binder, such as silica, alumina, or clay mineral, and subjected to granulation or shaping before being used as a water vapor adsorbent.

Also in the zeolite thus produced, as described above, in order to achieve sufficient adsorption of water vapor, water vapor adsorption and desorption cycle durability, and submersion test durability, the amount of group 11 metal ranges from 0.1% to 15% by weight, preferably 0.1% to 10% by weight, more preferably 0.2% to 5% by weight, still more preferably 0.3% to 3% by weight, of the zeolite.

[Characteristics of Zeolite Containing or Loaded with Group 11 Metal]

<Change in Adsorption Amount>

A zeolite containing or loaded with a group 11 metal according to the present invention can be suitably used in a water vapor adsorbent for adsorption heat pumps when a change in relative vapor pressure of 0.15 in a relative vapor pressure range of 0.05 or more and 0.30 or less preferably causes a change in the amount of adsorbed water of 0.15 g-$H_2O$/g or more, more preferably 0.16 g-$H_2O$/g or more, still more preferably 0.18 g-$H_2O$/g or more.

<Water Vapor Adsorption and Desorption Cycle Performance>

A zeolite containing or loaded with a group 11 metal according to the present invention can have an adsorption retention ratio of 80% or more in the following water vapor adsorption and desorption cycle test.

(Water Vapor Adsorption and Desorption Cycle Test)

A sample held in a vacuum vessel at 90° C. is repeatedly exposed to a 5° C. saturated water vapor atmosphere for 90 seconds and a 90° C. saturated water vapor atmosphere for 90 seconds. Part of water adsorbed on the sample during exposure to the 90° C. saturated water vapor atmosphere is desorbed during exposure to the 5° C. saturated water vapor atmosphere and moves into a water tank held at 5° C. The average adsorption per cycle (Cn; m (g/g)) is calculated as described below from the total amount of water (Qn; m (g)) that moved into the 5° C. water tank from m-th cycle of adsorption to n-th cycle of desorption and the dry weight of the sample (W (g)).

$$[Cn;m]=[Qn;m]/(n-m+1)/W$$

The adsorption retention ratio is the ratio of the average adsorption between the 1001th cycle and the 2000th cycle to the average adsorption between the first cycle and the 1000th cycle in the water vapor adsorption and desorption cycle test. A high adsorption retention ratio based on the average adsorption indicates little or no degradation of the zeolite in the water adsorption and desorption cycle.

The adsorption retention ratio of a zeolite containing or loaded with a group 11 metal according to the present invention is preferably 80% or more, more preferably 90% or more, still more preferably 95% or more. The upper limit of the adsorption retention ratio is 100%, which indicates no degradation of the zeolite.

<Water Resistance>

A zeolite containing or loaded with a group 11 metal according to the present invention can have an adsorption retention ratio of 70% or more in the following submersion test at 100° C. for 24 hours.

(Submersion Test)

A slurry of 0.5 g of a sample dispersed in 5 g of water is poured into a fluoropolymer inner tube in a stainless steel autoclave. After the slurry is left standing at 100° C. for 24 hours, the sample is collected by filtration and is dried at 100° C. for 12 hours.

The adsorption retention ratio in the submersion test is the ratio of the amount of adsorbed water vapor after the submersion test to the amount of adsorbed water vapor before the submersion test at a relative humidity (P/Ps) of 0.3. High submersion resistance of zeolite indicates little or no deterioration in water vapor adsorption capacity of the zeolite after the submersion test at 100° C. for 24 hours.

The adsorption retention ratio of a zeolite containing or loaded with a group 11 metal according to the present invention after the submersion test is preferably 80% or more, more preferably 90% or more, still more preferably 95% or more.

[Adsorption Heat Pump]

As described above, a zeolite containing or loaded with a group 11 metal according to the present invention has a high adsorption retention ratio and high water resistance, such as submersion resistance. A water vapor adsorbent according to the present invention that contains such a zeolite containing or loaded with a group 11 metal can realize an adsorption heat pump that can operate even with a relatively low temperature heat source of 100° C. or less.

An adsorption heat pump according to the present invention that contains a water vapor adsorbent according to the present invention may have any structure. For example, the adsorption heat pump includes an adsorber, which repeatedly adsorbs an adsorbate (water vapor) on the adsorbent while releasing the heat of adsorption and desorbs the adsorbate from the adsorbent utilizing external heat, an evaporator, which removes the cold energy generated by the evaporation of the adsorbate and returns the resulting adsorbate vapor to the adsorber, and a condenser, which condenses the vapor of the adsorbate desorbed in the adsorber utilizing external cold energy and supplies the condensed adsorbate to the evaporator.

An adsorption heat pump according to the present invention is preferably used in a process performed under the conditions where the water vapor desorption temperature (Td) and the cold energy generating temperature (Tcool) satisfy the following formulae (i) and (ii) when the water vapor adsorption temperature (Ta) ranges from 25° C. to 45° C.

$$Ta+28° C. \leq Td \leq 100° C. \qquad (i)$$

$$Ta-25° C. < Tcool < 25° C. \qquad (ii)$$

Figure 2:
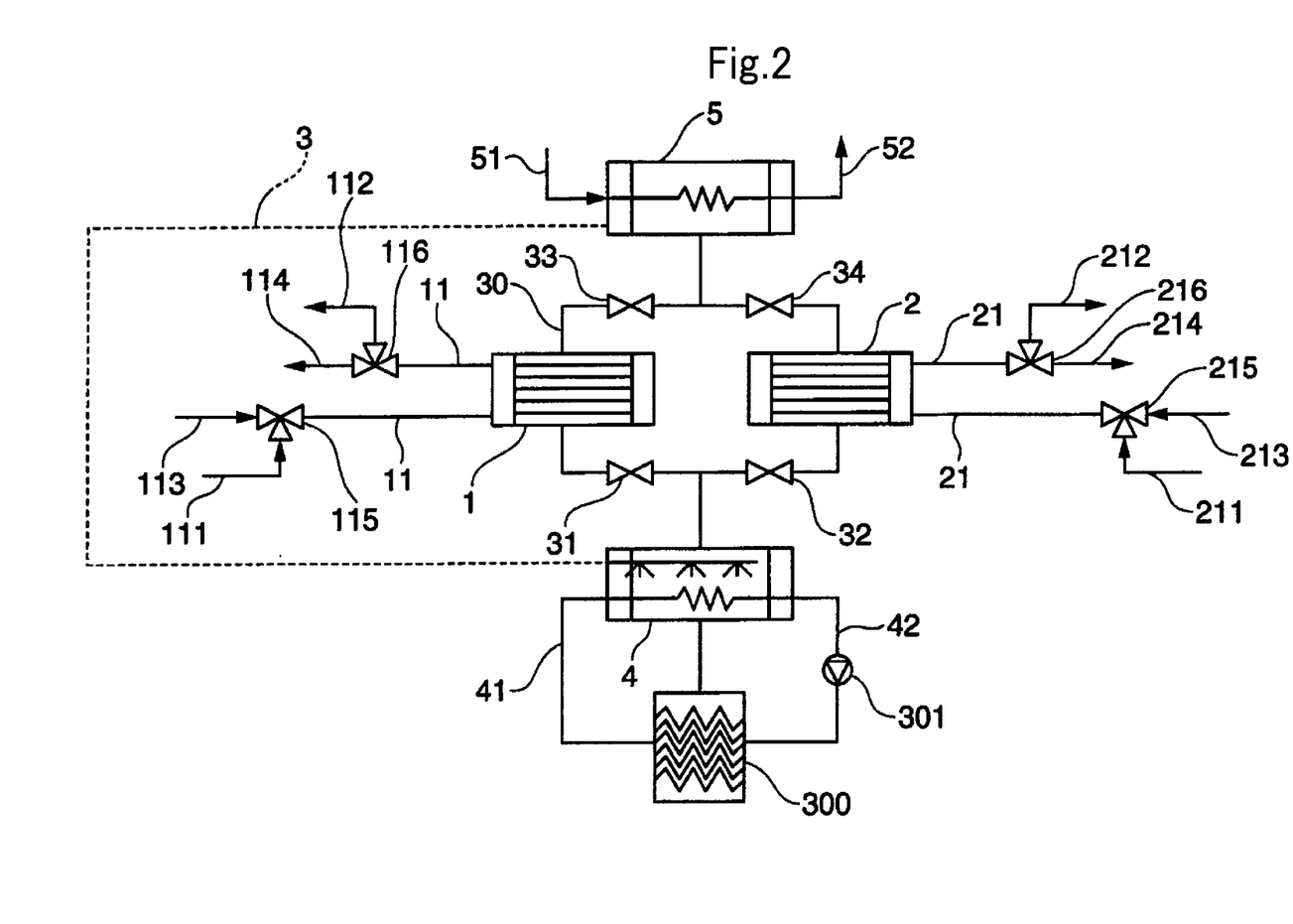
FIG. 2 is a flow chart of an adsorption heat pump containing an adsorbent for use in adsorption heat pumps according to the present invention.

An adsorption heat pump according to the present invention will be described below with reference to FIG. 2. FIG. 2 is a flow chart of an adsorption heat pump containing an adsorbent for use in adsorption heat pumps according to the present invention.

An adsorption heat pump according to the present invention contains the adsorbent described above. Roughly speaking, as illustrated in FIG. 2, the adsorption heat pump includes adsorbers (1) and (2), each of which is charged with the adsorbent, repeatedly adsorbs an adsorbate on the adsorbent while releasing the heat of adsorption and desorbs the adsorbate from the adsorbent utilizing external heat, and transfers heat generated by the adsorption of the adsorbate to a heat transfer medium, an evaporator (4), which removes the cold energy generated by the evaporation of the adsorbate and returns the resulting adsorbate vapor to the adsorbers (1) and (2), and a condenser (5), which condenses the vapor of the adsorbate desorbed in the adsorbers (1) and (2) utilizing external cold energy, supplies the condensed adsorbate to the evaporator (4), and releases heat generated by the condensation of the adsorbate to the outside.

Each inlet of the adsorbers (1) and (2) charged with the adsorbent is coupled to each other via an adsorbate pipe (30). Each outlet of the adsorbers (1) and (2) is also coupled to each other via the adsorbate pipe (30). The adsorbate pipes (30) are equipped with control valves (31) to (34). In the adsorbate pipes (30), the adsorbate is a vapor or a mixture of liquid and vapor.

The adsorber (1) is connected to a heat transfer medium pipe (11), and the adsorber (2) is connected to a heat transfer medium pipe (21). The heat transfer medium pipe (11) is equipped with switching valves (115) and (116). The heat transfer medium pipe (21) is equipped with switching valves (215) and (216). A heat transfer medium that serves as a heat source for heating the adsorbent in the adsorbers (1) and (2) or a heat transfer medium that serves as a cooling source for cooling the adsorbent can flow through the heat transfer medium pipes (11) and (21). The heat transfer medium may be a medium that can effectively heat or cool the adsorbent in the adsorbers (1) and (2).

In the desorption process, for example, hot water is introduced through an inlet (113) into the adsorber (1) and is discharged through an outlet (114) by the opening and closing of the switching valves (115) and (116). In the adsorption process, for example, cooling water is introduced through an inlet (111) into the adsorber (1) and is discharged through an outlet (112) by the opening and closing of the switching valves (115) and (116). In the desorption process in the adsorber (2), for example, hot water is introduced through an inlet (213) into the adsorber (2) and is discharged through an outlet (214) by the opening and closing of the switching valves (215) and (216). In the adsorption process, for example, cooling water is introduced through an inlet (211) into the adsorber (2) and is discharged through an outlet (212) by the opening and closing of the switching valves (215) and (216).

Although not shown in the figure, in order to supply hot water, the heat transfer medium pipes (11) and (21) are coupled to a heat source for heating water and a pump for circulating hot water, and in order to supply cooling water the heat transfer medium pipes (11) and (21) are coupled to an outdoor unit for heat exchange with the outside air. The heat source may be a cogeneration unit, such as a gas engine or a gas turbine, or a fuel cell.

The inlet adsorbate pipes (30) of the adsorbers (1) and (2) are connected to the evaporator (4), and the outlet adsorbate pipes (30) of the adsorbers (1) and (2) are connected to the condenser (5). The adsorbers (1) and (2) are disposed in parallel between the evaporator (4) and the condenser (5). A return pipe (3) for returning an adsorbate condensed in the condenser (5) to the evaporator (4) is disposed between the condenser (5) and the evaporator (4). The reference numeral (41) refers to a cold water pipe for cooling output from the evaporator (4). The reference numeral (42) refers to a cold water pipe serving as a cold water outlet. An indoor unit (300) for heat exchange with an indoor space (air conditioned space) and a pump (301) for circulating cold water are disposed between the cold water pipe (41) and the cold water pipe (42). The reference numeral (51) refers to a cooling water inlet pipe connected to the condenser (5). The reference numeral (52) refers to a cooling water outlet pipe.

EXAMPLES

The present invention will be further described in the following examples and comparative examples. The present invention is not limited to these examples without departing from the gist of the present invention.

In the following examples and comparative examples, a water vapor adsorption and desorption cycle test, a submersion test, and water vapor adsorption isotherm measurements were performed as described below.

<Water Vapor Adsorption and Desorption Cycle Test>

A sample held in a vacuum vessel at 90° C. is repeatedly exposed to a 5° C. saturated water vapor atmosphere for 90 seconds and a 90° C. saturated water vapor atmosphere for 90 seconds. Part of water adsorbed on the sample during exposure to the 90° C. saturated water vapor atmosphere is desorbed during exposure to the 5° C. saturated water vapor atmosphere and moves into a water tank held at 5° C. The average adsorption per cycle (Cn; m (g/g)) is calculated as described below from the total amount of water (Qn; m (g)) that moved into the 5° C. water tank from m-th cycle of adsorption to n-th cycle of desorption and the dry weight of the sample (W (g)).

$$[Cn;m]=[Qn;m]/(n-m+1)/W$$

The adsorption retention ratio is the ratio of the average adsorption between the 1001th cycle and the 2000th cycle to the average adsorption between the first cycle and the 1000th cycle in the water vapor adsorption and desorption cycle test.

<Submersion Test>

A slurry of 0.5 g of a sample dispersed in 5 g of water is poured into a fluoropolymer inner tube in a stainless steel autoclave. After the slurry is left standing at 100° C. for 24 hours, the sample is collected by filtration and is dried at 100° C. for 12 hours.

The adsorption retention ratio is the ratio (percentage) of the amount of adsorbed water vapor after the submersion test to the amount of adsorbed water vapor before the submersion test at a relative humidity (P/Ps) of 0.3.

<Water Vapor Adsorption Isotherm>

After a sample was degassed at 120° C. for 5 hours, a water vapor adsorption isotherm at 25° C. was measured with a vapor adsorption measuring apparatus (Belsorp 18, BEL Japan, Inc.) under the following conditions.

Air thermostat temperature: 50° C.
Adsorption temperature: 25° C.
Initial introduction pressure: 3.0 torr
Number of introduction pressure set points: 0
Saturated vapor pressure: 23.755 torr
Equilibrium time: 500 seconds Example 1

A silicoaluminophosphate zeolite was synthesized using a method disclosed in Example 2 of Japanese Unexamined Patent Application Publication No. 2003-183020. An XRD measurement of the zeolite showed that the zeolite had a CHA structure (framework density=14.6 T/1,000 cubic angstroms). An ICP composition analysis of the zeolite showed that the ratios (molar ratios) of a silicon atom, an aluminum atom, and a phosphorus atom of the framework structure to the total of the silicon atom, the aluminum atom, and the phosphorus atom were 0.092 for the silicon atom, 0.50 for the aluminum atom, and 0.40 for the phosphorus atom.

Next, 2 kg of the zeolite, 78 g of copper (II) acetate monohydrate (manufactured by Kishida Chemical Co., Ltd.), and 3000 g of pure water were stirred to prepare an aqueous slurry. The aqueous slurry was dried with a 1200ϕ disk atomizer spray dryer. The drying conditions included an inlet temperature of 200° C. and an outlet temperature of 120° C. The number of revolutions of the disk was 18000 rpm. The slurry was supplied to the dryer at a rate of 1.5 kg/h, and 577 g of a dry powder was collected in one hour. The drying time was 10 seconds or less. The dry powder was fired in an airflow at 800° C. for two hours, thus yielding a sample 1.

An ICP analysis showed that the Cu loading of the sample 1 was 1.5% by weight of the zeolite.

Figure 1:
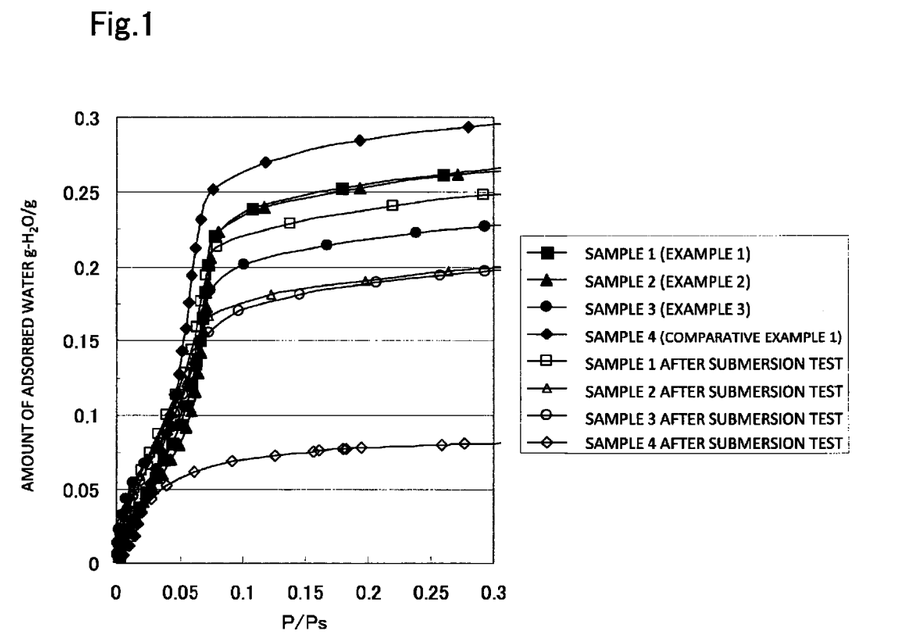
FIG. 1 is a graph of water vapor adsorption isotherm measurement results before and after a submersion test of a zeolite in Examples 1 to 3 and Comparative Example 1.

FIG. 1 shows water vapor adsorption isotherm measurement results before and after the submersion test of the sample 1. Table 1 shows the adsorption retention ratios after the water vapor adsorption and desorption cycle test and after the submersion test.

Example 2

A zeolite was synthesized in the same manner as in Example 1.

Next, 2 kg of the zeolite, 117 g of copper (II) acetate monohydrate (manufactured by Kishida Chemical Co., Ltd.), and 3000 g of pure water were stirred to prepare an aqueous slurry. The aqueous slurry was subjected to spray drying and firing in the same manner as in Example 1, thus yielding a sample 2.

An ICP analysis showed that the Cu loading of the sample 2 was 1.0% by weight of the zeolite.

FIG. 1 shows water vapor adsorption isotherm measurement results before and after the submersion test of the sample 2. Table 1 shows the adsorption retention ratios after the water vapor adsorption and desorption cycle test and after the submersion test.

Example 3

8.1 g of 85% by weight phosphoric acid and 5.4 g of pseudo-boehmite (water content: 25% by weight, manufactured by Condea) were gradually added to 10 g of water and were stirred for one hour. 0.6 g of fumed silica (Aerosil 200, manufactured by Nippon Aerosil Co., Ltd.) and 10 g of water were added to the mixture and were stirred for one hour. 3.4 g of morpholine and 4.0 g of triethylamine were then gradually added to the mixture and were stirred for one hour. The mixture is hereinafter referred to as a liquid A.

Separately from the liquid A, a liquid B was prepared by dissolving 1.0 g of $Cu(CH_3COO)_2 \cdot H_2O$ (manufactured by Kishida Chemical Co., Ltd.) in 13.4 g of water and adding 1.0 g of tetraethylenepentamine (manufactured by Kishida Chemical Co., Ltd.) to the solution.

The liquid B was gradually added to the liquid A. The mixture was stirred for one hour to prepare an aqueous gel having the following composition.

<Aqueous Gel Composition (Molar Ratio)>
$SiO_2$: 0.25
$Al_2O_3$: 1
$P_2O_5$: 0.875
CuO: 0.125
Tetraethylenepentamine: 0.125
Morpholine: 1
Triethylamine: 1
Water: 50

The aqueous gel thus prepared was poured into a fluoropolymer inner tube in a 100-ml stainless steel autoclave and was allowed to react at 190° C. for 36 hours while stirring at 15 rpm. After the hydrothermal synthesis and cooling, supernatant was removed by decantation to collect a precipitate. The precipitate was washed with water three times, was filtered off, and was dried at 100° C. The precipitate was fired at 550° C. in an airflow to remove organic substances and was subjected to hydrothermal treatment with 10% by volume water vapor at 800° C. in an air atmosphere at a space velocity SV=3000/h for 5 hours, yielding a sample 3.

An XRD measurement of the zeolite showed that the zeolite had a CHA structure (framework density=14.6 T/1,000 cubic angstroms). An EDX analysis showed that the Cu loading was 6.2% by weight of the zeolite. An EDX composition analysis of the zeolite showed that the ratios (molar ratios) of a silicon atom, an aluminum atom, and a phosphorus atom of the framework structure to the total of the silicon atom, the aluminum atom, and the phosphorus atom were 0.10 for the silicon atom, 0.49 for the aluminum atom, and 0.41 for the phosphorus atom.

FIG. 1 shows water vapor adsorption isotherm measurement results before and after the submersion durability test of the sample 3. Table 1 shows the adsorption retention ratios after the water vapor adsorption and desorption cycle test and after the submersion test.

Comparative Example 1

In the same manner as in Example 1, a silicoaluminophosphate zeolite was synthesized using a method disclosed in Example 2 of Japanese Unexamined Patent Application Publication No. 2003-183020. The silicoaluminophosphate zeolite is hereinafter referred to as a sample 4.

FIG. 1 shows water vapor adsorption isotherm measurement results before and after the submersion durability test of the sample 4. Table 1 shows the adsorption retention ratios after the water vapor adsorption and desorption cycle test and after the submersion test.

TABLE 1

| | | Adsorption retention ratio after adsorption and desorption test (%) | Adsorption retention ratio after submersion test (%) |
|---|---|---|---|
| Example 1 | Sample 1 | 100 | 96.6 |
| Example 2 | Sample 2 | 100 | 77 |
| Example 3 | Sample 3 | 91 | 86.8 |
| Comparative example 1 | Sample 4 | 100 | 39.6 |

These results show that a water vapor adsorbent for adsorption heat pumps according to the present invention can realize an adsorption heat pump that can operate with a relatively low temperature heat source of 100° C. or less. The results also show that the adsorbent has high submersion resistance in particular.

Although the present invention has been described in detail with reference to particular embodiments, it is apparent to a person skilled in the art that various modifications can be made therein without departing from the spirit and scope of the present invention.

The present application is based on Japanese Patent Application No. 2011-235052 filed on Oct. 26, 2011, which is incorporated herein by reference in its entirety.

The invention claimed is:

1. An adsorption heat pump having a water vapor adsorbent, the water vapor adsorbent comprising:
   a zeolite that comprises at least a silicon atom, an aluminum atom, and a phosphorus atom in its framework structure;
   wherein:
   the zeolite framework structure has a framework density of 12.0 T/1,000 to 16.0 T/1,000 cubic angstroms;
   the water vapor adsorbent further comprises a group 11 metal in an amount 0.1% to 15% by weight of the zeolite; and
   the water vapor adsorbent is obtained by a method comprising loading the group 11 metal onto the zeolite.

2. The adsorption heat pump of claim 1, wherein the zeolite has a zeolite structure of CHA.

3. The adsorption heat pump of claim 1, wherein a change in relative vapor pressure of 0.15 in a relative vapor pressure range of 0.05 or more and 0.30 or less causes a change in the amount of water adsorbed to the water vapor adsorbent of 0.15 g-$H_2O$/g or more.

4. A method for producing the adsorption heat pump of claim 1, comprising:
   loading a group 11 metal onto a zeolite that comprises at least a silicon atom, an aluminum atom, and a phosphorus atom in its framework structure and that has a framework density of 12.0 T/1,000 to 16.0 T/1,000 cubic angstroms to produce the water vapor adsorbent, and
   adding the water vapor adsorbent to the adsorption heat pump.

5. The adsorption heat pump of claim 1, wherein the group 11 metal is copper.

6. The adsorption heat pump of claim 1, wherein the water vapor adsorbent comprises the group 11 metal in an amount of 0.1% to 3% by weight of the zeolite.

7. The adsorption heat pump of claim 1, wherein the water vapor adsorbent comprises the group 11 metal in an amount of 0.1% to 1.5% by weight of the zeolite.

8. The adsorption heat pump of claim 1, wherein the water vapor adsorbent comprises the group 11 metal in an amount of 0.3% to 1.5% by weight of the zeolite.

* * * * *